(12) United States Patent
Yang

(10) Patent No.: US 7,706,342 B2
(45) Date of Patent: Apr. 27, 2010

(54) ENHANCED MULTI-USER PACKETS WITH EXTENDED MAC INDEX SPACE FOR WIRELESS COMMUNICATIONS

(75) Inventor: Yunsong Yang, San Diego, CA (US)

(73) Assignee: ZTE (USA) Inc., Iselin, NJ (US)

( * ) Notice: Subject to any disclaimer, the term of this patent is extended or adjusted under 35 U.S.C. 154(b) by 812 days.

(21) Appl. No.: 11/507,206

(22) Filed: Aug. 17, 2006

(65) Prior Publication Data

US 2007/0253383 A1 Nov. 1, 2007

Related U.S. Application Data

(60) Provisional application No. 60/709,218, filed on Aug. 17, 2005, provisional application No. 60/709,865, filed on Aug. 19, 2005.

(51) Int. Cl.
*H04W 4/00* (2009.01)

(52) U.S. Cl. ........................ 370/338; 370/349

(58) Field of Classification Search ................ None
See application file for complete search history.

(56) References Cited

U.S. PATENT DOCUMENTS

| | | | |
|---|---|---|---|
| 5,418,813 A | 5/1995 | Schaffner et al. | |
| 6,298,051 B1 | 10/2001 | Odenwalder et al. | |
| 6,332,006 B1 | 12/2001 | Rydbeck et al. | |
| 6,587,460 B1* | 7/2003 | Bell et al. | 370/385 |
| 7,065,060 B2 | 6/2006 | Yun et al. | |
| 7,308,280 B2 | 12/2007 | Huh et al. | |
| 7,526,089 B2* | 4/2009 | Wada et al. | 380/239 |
| 2002/0006127 A1* | 1/2002 | Horikawa | 370/389 |
| 2002/0039355 A1 | 4/2002 | Yun et al. | |
| 2005/0147251 A1* | 7/2005 | Wada et al. | 380/277 |
| 2006/0256709 A1* | 11/2006 | Yang | 370/206 |
| 2006/0268878 A1* | 11/2006 | Jung et al. | 370/392 |
| 2007/0064692 A1* | 3/2007 | Pi et al. | 370/389 |
| 2007/0178916 A1* | 8/2007 | Sorbara et al. | 455/458 |
| 2007/0253467 A1 | 11/2007 | Yang | |

* cited by examiner

*Primary Examiner*—Ajit Patel
(74) *Attorney, Agent, or Firm*—Fish & Richardson P.C.

(57) ABSTRACT

The present invention provides methods for identifying the target mobile stations for data transmission in a wireless communication network. An enhanced Multi-User Packet format that supports both the legacy MAC Index and the new extended MAC Index in the same packet is described. The length of extended MAC Index can be variable.

6 Claims, 4 Drawing Sheets

FIG. 2 *(PRIOR ART)*

ENHANCED MULTI-USER PACKETS WITH EXTENDED MAC INDEX SPACE FOR WIRELESS COMMUNICATIONS

CROSS REFERENCE TO RELATED APPLICATION

This application claims the benefits of U.S. Provisional Patent Application No. 60/709,218 entitled "Enhanced Multi-User Packet with Extended MAC Index Space" and filed on Aug. 17, 2005 and 60/709,865 entitled "Enhanced Multi-User Packet" and filed on Aug. 19, 2005. This application incorporates by reference the entire disclosures of the above two applications as part of the specification of this application.

BACKGROUND

The specification of this application relates to wireless communication networks including techniques for identifying mobile stations by base stations for transmission of data packets.

Wireless communication systems use a network of base stations to communicate with wireless devices registered for services in the systems. Each of the base stations and wireless devices is a radio transceiver which transmits and receives radio signals modulated with communication information which can include, among others, data such as voice data and other data content. In a wireless network, the wireless service to a geographic area is provided by dividing the area into radio cells and each radio cell can be further divided into two or more cell sectors. Base stations conceptually locate at the center of respective cells of their coverage and transmit information to a mobile station via forward link or downlink radio signals. Mobile stations transmit information to their serving base stations via reverse link or uplink radio signals. The radio signals between the base stations and mobile stations can be modulated to include voice or data traffic signals or both.

FIG. 1 illustrates one example of a wireless communication system which provides wireless services wireless devices or mobile stations situated within a geographic region 100. The region 100 is divided into a number of radio cells 110, conceptually represented by a hexagon in a honeycomb pattern. In practice, however, each cell may have an irregular shape, depending on various factors including the terrain surrounding the cell and traffic density. Each cell may be further divided into two or more sectors. One particular wireless communication system designed for high speed packet data services is 1xEV-DO, which is also known as High Date Rate (HDR) or High Rate Packet Data (HRPD) system. 1xEV-DO has been standardized as C.S0024 in the international standard group Third Generation Project Partnership Two (3GPP2) and has been published as IS-856 Revision 0 and Revision A standards in the United States.

In 1xEV-DO system, a mobile station 132, 134, which is also known as the access terminal (AT), determines and reports the data rate that can be supported on the forward link in the Data Rate Control (DRC) message. The base station 120, which is also known as the access network (AN), selects one Physical Layer packet for forward link transmission at a particular time slot, based on the DRC messages received from various mobile stations. The Physical Layer packet may be given more than one time slot for transmission. In this case, the transmit slots of a Physical Layer packet are separated by three intervening slots, during which the slots of other Physical Layer packets can be transmitted. If a positive acknowledgement (ACK) is received on the reverse link ACK Channel before all of the allocated slots have been transmitted, the remaining un-transmitted slots will not be transmitted and the next allocated slot may be used for the first slot of a new Physical Layer packet transmission. This technique is known as Hybrid Automatic Repeat Request (HARQ).

In order to identify a target mobile station to which a forward data packet is directed, the base station transmits a preamble on the in-phase branch of the complex signal (I-branch) before transmission of the forward data packet. Meanwhile, no signals are transmitted on the quadrature branch of the complex signal (Q-branch). The preamble contains a repetition of a 32 chip bi-orthogonal sequence as in 15-856 Revision 0 standard, or repetition of 64 chip bi-orthogonal sequence as in 15-856 Revision A standard. The 32-chip bi-orthogonal sequence is defined in terms of the 32-ary Walsh functions and their bit-by-bit complements by $$W_{i/2}^{32} \text{ for } i=0, 2, \ldots, 62 \tag{1}$$

$$\overline{W_{(i-1)/2}^{32}} \text{ for } i=1, 3, \ldots, 63 \tag{2}$$

where $i=0, 1, \ldots, 63$ is the Media Access Control (MAC) Index value and $\overline{W_i^{32}}$ is the bit-by-bit complement of the 32-chip Walsh function of order i. The MAC Index is a number, which is assigned by the base station for identifying a mobile station in the system. Some MAC Index values are used as common values to all mobile stations for the purpose to identify the Control Channel, Broadcast, or Multi-User Packet transmissions. The 64-chip bi-orthogonal sequence is defined in terms of the 64-ary Walsh functions and their bit-by-bit complements by $$W_{i/2}^{64} \text{ for } i=0, 2, 126 \tag{3}$$

$$\overline{W_{(i-1)/2}^{64}} \text{ for } i=1, 3, \ldots 127 \tag{4}$$

where $i=0, 1, \ldots, 127$ is the MAC Index value and $\overline{W_i^{64}}$ is the bit-by-bit complement of the 64-chip Walsh function of order i. The repetition of 32-chip bi-orthogonal sequence is a subset of the 64-chip bi-orthogonal sequence, as Walsh functions can be generated by means of the following recursive procedure:

$$H_1 = 0, \tag{5}$$

$$H_2 = \begin{matrix} 0 & 0 \\ 0 & 1 \end{matrix},$$

$$H_4 = \begin{matrix} 0 & 0 & 0 & 0 \\ 0 & 1 & 0 & 1 \\ 0 & 0 & 1 & 1 \\ 0 & 1 & 1 & 0 \end{matrix},$$

$$H_{2N} = \begin{matrix} H_N & H_N \\ H_N & \overline{H_N} \end{matrix},$$

where N is a power of 2 and $\overline{H_N}$ denotes the binary complement of $H_N$. Therefore, IS-856 Revision A standard doubles the MAC Index numbers while supporting the legacy mobile stations that comply with the IS-856 Revision 0 standard in an IS-856 Revision A network. The length of the preamble is variable from 64 chips to 1024 chips, depending on the data packet format.

The IS-856 Revision A standard provides a Multi-User Packet (MUP) to support real-time or near real-time services such as Voice over Internet Protocol (VoIP). A MUP is a data packet having one or more Security Layer packets addressed to different mobile stations. The base station transmits a preamble with a common MAC Index value for each Multi-User Packet to all mobile stations that support the Multi-User Packet. The individual MAC Index values for the target mobile stations of the Multi-User Packet are embedded in the MAC Header in each MAC Layer packet. A mobile station decodes the Multi-User Packet to determine whether it is one of the target mobile stations specified in the Multi-User Packet. A maximum of 128 MAC Index values can be supported in an IS-856 Revision A system.

SUMMARY

The specification of this application describes, among others, techniques to support the Multi-User MAC Layer Packet format with extended MAC Index space to provide more a large number of MAC Index values for identifying mobile stations in a single cell sector by a single base station. Implementations of the present techniques can allow for serving more than 128 mobile stations in a single cell sector by a single base station and backward compatibility with the IS-856 legacy Mac Index values so that legacy mobile stations can be served in a wireless system.

For example, as 1xEV-DO evolves to provide broadband services, particularly with a multi-carrier based solution, a wireless communication system may need to support more than 128 mobile stations for each sector. To further illustrate this situation, a base station may be able to serve a large number of mobile stations within the bandwidth of the base station in VoIP and other applications when at least some of the mobile stations, such as mobile stations transmitting and receiving VoIP data, operate at a relatively small bandwidth. The current upper limit of 128 mobile stations that can be simultaneously supported by a single base station in a cell sector can be insufficient for such applications and the present techniques can be used to expand the capacity of the base station in each sector to a number beyond the 128 under IS-856 Revision A. In addition, the present techniques can be implemented to support a variable length of the MAC Index space so that further extension of the MAC Index space in the future compatible with the mobile stations that comply with the present techniques.

In one example method to support the Multi-User MAC Layer Packet (MUP) format with the extended MAC Index space, a Redirect MAC Index that is known to new mobile stations, unknown to legacy mobile stations but not in conflict with any MAC index that has been assigned to a legacy mobile, is placed in the first Packet Info field in the MUP. The first length field is placed after the first Packet Info to indicate the total length of all the MAC Header related fields for all new mobile stations, such as a packet information field (Pkt Info), a length field, and an optional MAC Index Extension field. The packet Info field and length field for all legacy mobile stations that are scheduled in the current MUP, if any, are inserted after the first length field. A MAC Header Delimiter field, which can be assigned a value of "00000000," is inserted after the last length field for the legacy mobile stations, if there is at least one, or otherwise after the first length field. The Pkt Info fields and Length fields for all new mobile stations that are scheduled in the current MUP, and the optional MAC Index Extension are inserted after the MAC Header Delimiter and before the security packet. The security layer packets for all the legacy mobile stations that are scheduled in the current MUP, if any, are placed in the first section of MAC Layer payload field, followed by the security layer packets for all the new mobile station that are scheduled in the current MUP. An optional PAD field can be placed after the security layer packets. A MAC Layer Trailer is placed at the very end to indicate the end of the transmission.

A number of the advantages can be achieved in certain implementations of the present techniques. One advantage, for example, is to support a variable length for the extended MAC Index such that the implementation of the extended MAC Index can fit what is needed without incurring unnecessary overhead bits, meanwhile allowing further extension of MAC Index space in the future in a way that can be understood by the mobile stations that comply with the present techniques. Another advantage, for example, is to maintain an octet-orientated structure for the multi-user packet format so as to simplify the hardware and/or software implementation.

In the regard, the present techniques can be implemented by placing the most significant bits of the MAC Index that do not fit into the octet into MAC Index Trailer fields in the MAC Index Extension field and by adding MAC Header PAD fields, if necessary, to make the MAC Index Extension an integer number of octets long. A set of interpretation rules can be implemented in association with the MAC Index Trailer fields such that the mobile stations understand what the MAC Index Trailers represent and which New MAC Index they are associated, and how to determine a match with them.

The above and other features and advantages can be achieved while maintaining backward compatibility by allowing the legacy mobiles and new mobiles to be in the same MUP.

These and other implementations, variations and modifications are described in greater detail in the attached drawings, the detailed description and the claims.

DETAILED DESCRIPTION

Figure 1:
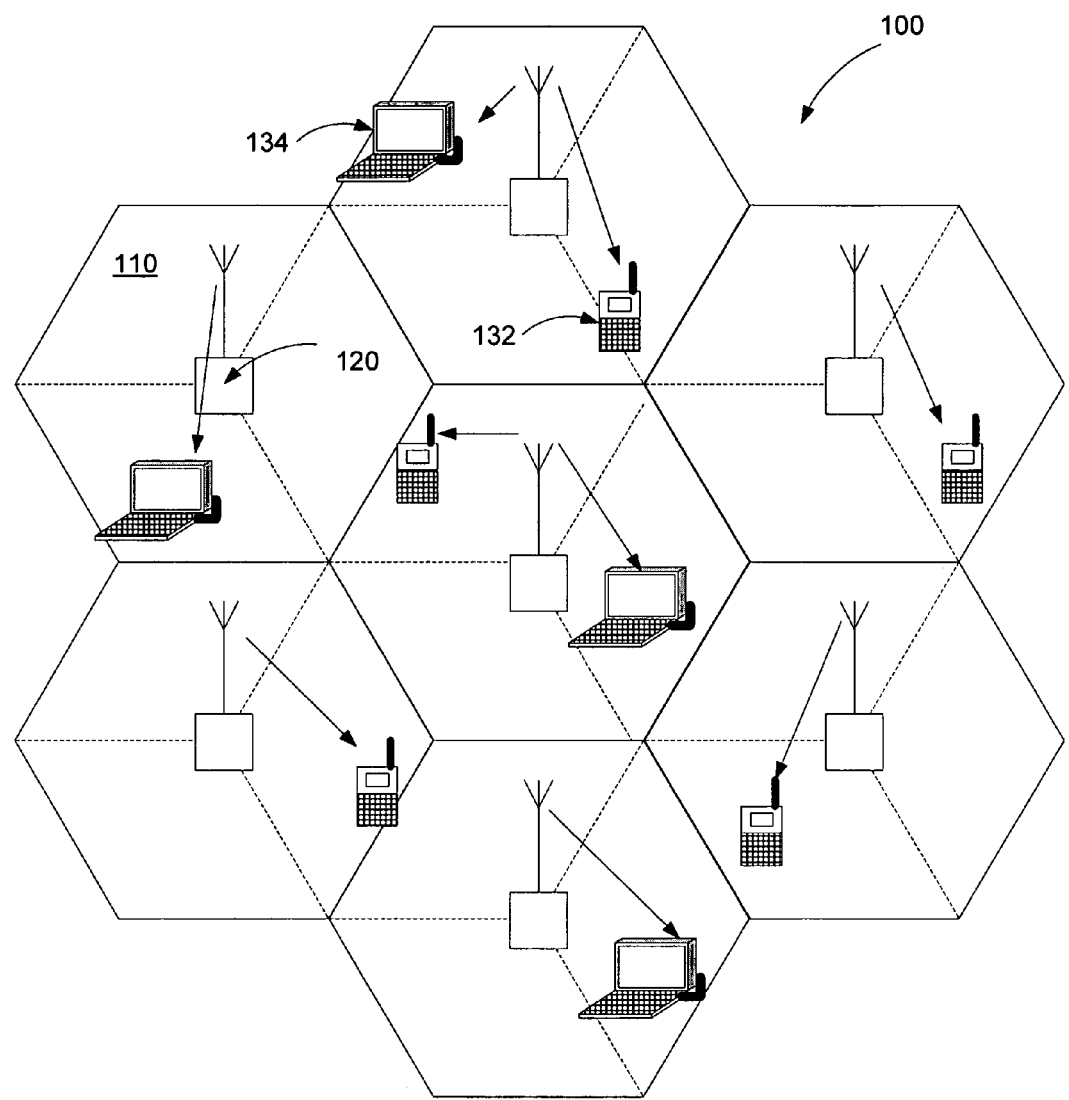
FIG. 1 is a diagram of a typical cellular structure in a wireless communication system.
Figure 2:
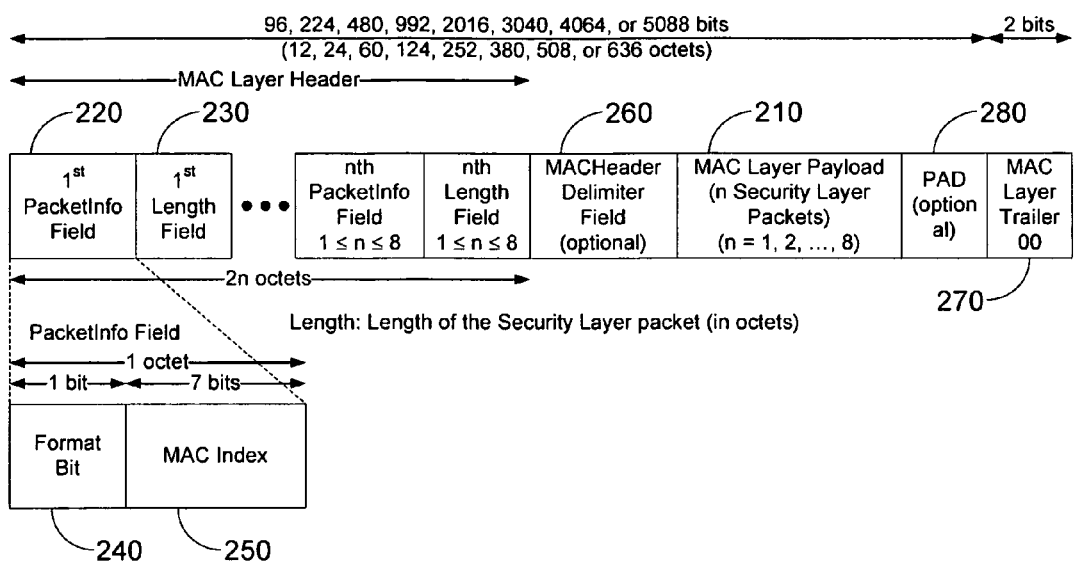
FIG. 2 is a diagram showing the format of Multi-User MAC Layer Packet in the existing 1xEV-DO system.

FIG. 2 shows one example of a forward link Multi-User MAC Layer Packet in a 1xEV-DO system that supports up to 128 mobile stations within one cell sector of a base station under IS-856 Revision A. This packet is part of a forward link sequence received by one or more mobile stations that have been assigned MAC index values as their identifiers. For example, the assignment of MAC indices to different mobile stations can be achieved by using Traffic Channel Assignment Message under IS-856. Upon receiving the packet in FIG. 2, each mobile station begins to search for the MAC index value that is assigned and searches for the associated data associated with the assigned MAC index value.

As illustrated, this Multi-User MAC Layer Packet includes MAC Layer Payload sequence 210 of n Security Layer packets, where n is an integer from one to eight. A MAC Layer header sequence includes n PacketInfo 220 fields and n Length 230 fields. The nth PacketInfo 220 field has a format bit 240 and seven bits of MAC Index 250 of the mobile station to which the nth security layer packet is addressed. The nth Length 230 field indicates the length, in octets, of the nth Security Layer packet in MAC Layer Payload 210. The MAC HeaderDelimiter 260 is included if the MAC Layer Packet size exceeds the sum of the length of the Security Layer Packets, MAC header, and MAC Trailer 270 by one or more octets. If included, MACHeaderDelimiter 260 is set to '0000000' in one implementation under IS-856 Revision A. Pad 280 bits are included if the size of the MAC Layer Packet exceeds the sum of the lengths of the n Security Layer packets, MAC header, MACHeaderDelimiter 260 (if included), and MAC Trailer 270. If included, Pad 280 bits are all "0". The preamble for a Multi-User Packet uses the common MAC Index values that are known to all mobile stations.

A wireless system based on the forward link data format in FIG. 2 has a limited capacity for simultaneously serving mobile stations in each cell sector of a base station. The data format in FIG. 2 can be modified to include additional fields to expand the capacity of the system. In one implementation, a method for wireless communications can be configured to provide in a forward data packet in the Media Access Control (MAC) Layer generated from a base station a MAC header sequence and a MAC payload sequence subsequent to the MAC header sequence. The MAC header sequence includes mobile station identification information to identify one or more target mobile stations, and the MAC payload sequence includes data packets directed to the one or more target mobile stations. In the MAC header sequence, one or more first MAC index fields are included and are respectively assigned first MAX index values up to a maximum MAC index value to identify respective mobile stations; and one or more second MAC index fields are also included and are respectively assigned second MAC index values greater than the maximum MAC index value. A redirect MAC index field is further included in the MAC header sequence at a position in time prior to the first MAC index fields and the second MAC index fields to direct a target mobile station to read the one or more first MAC index fields when the target mobile station is assigned a MAC index value less than the maximum MAC index value and to read the one or more second MAC index fields when the target mobile is assigned a MAC index value greater than the maximum MAC index value, wherein the redirect MAX index value is not used to identify a particular mobile station.

Figure 3:
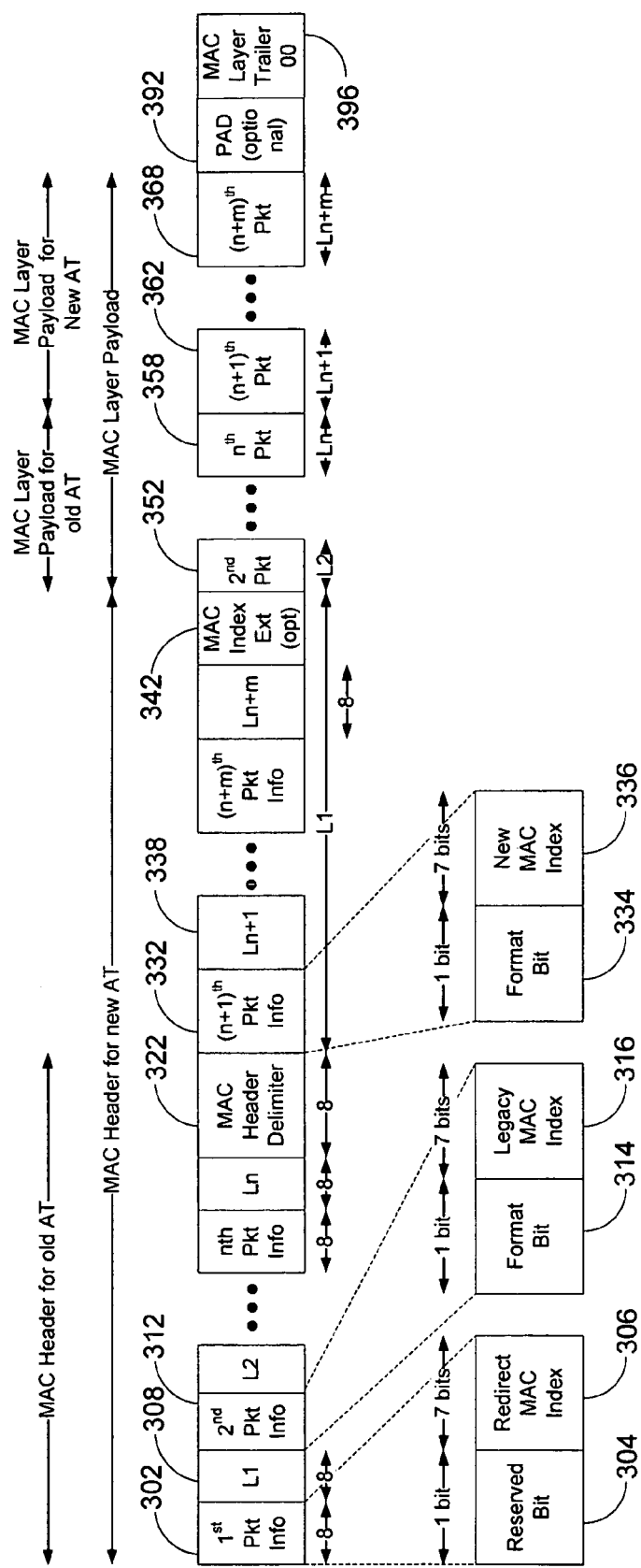
FIG. 3 is a diagram showing the enhanced format of Multi-User MAC Layer Packet to support variable-length MAC index space.

FIG. 3 illustrates an example of the enhanced Multi-User Packet (MUP) format that supports a variable-length of MAC Index space, according to one embodiment. This enhanced MUP format is used when there is at least one new mobile station that uses the increased MAC Index space and has a MAC Index greater than 127. It is not necessary to have at least one legacy mobile station in the same enhanced MUP. When there is no new mobile station in the MUP. The legacy MUP format can be used.

The data format in FIG. 3 can be used to implement an enhanced method and to support the Multi-User MAC Layer Packet format. This method in one implementation includes placing a Redirect MAC Index that is known to new mobile stations, unknown to legacy mobile stations but not conflict with any MAC index that has been assigned to a legacy mobile, in the first Packet Info 302 field in the MUP; and placing the first length 308 field after the first Packet Info 302 to indicate the total length of all the MAC Header related fields for all new mobile stations, such as Pkt Info 332, Length 338, and the optional MAC Header PAD 342; Inserting the packet Info field and length field for all legacy mobile stations that are scheduled in the current MUP, if any, after the first length field 308; inserting a MAC Header Delimiter field 322, that is "00000000", after the last length field for the legacy mobile stations, if there is at least one, or otherwise after the first length field 308; inserting the Pkt Info 332 fields and Length 338 fields for all new mobile stations that are scheduled in the current MUP, and the optional MAC Header PAD 342 after the MAC Header Delimiter 322 and before the security packet 352; placing the security layer packet for all the legacy mobile stations that are scheduled in the current MUP, if any, in the first section of MAC Layer payload field, followed by the security layer packets for all the new mobile station that are scheduled in the current MUP; inserting a PAD 392 field optionally; and placing the MAC Layer Trailer 396 in the end.

In the example in FIG. 3, the enhanced Multi-User MAC Layer Packet includes (n+m) Pkt (Packet) Info 302, 312, 332 fields and (n+m) Length 308, 338 fields, a MAC Header Delimiter 322 field, an optional MAC Index Ext (Extension) 342 field, a MAC Layer Payload of (n+m−1) Security Layer packets 352, 358, 362, 368, an optional MAC Layer Pad 392, and a MAC Layer Trailer 396, where n and m are positive integer numbers.

The first Pkt Info 302 field includes 1-bit reserved bit 304 and the seven bits of a Redirect MAC Index 306. The Redirect MAC Index 306 is one of the legacy 7-bit long MAC Index that is known to all new mobile stations. It is unknown to the legacy mobile stations but not conflict with any MAC index that has been assigned to legacy mobile stations by the base station. The Reserved Bit 304 can be set to "0" or "1". In some realization, the Reserved Bit 304 and Redirect MAC Index 306 can be jointly considered as a Redirect MAC Index. In this case, the seven least significant bits (LSBs) of this Redirect MAC Index still needs to be one of the legacy 7-bit long MAC Index that is known to all new mobile stations, unknown to the legacy mobile stations but not conflict with any MAC index that has been assigned to legacy mobile stations by the base station.

The Length field L1 308 after the first Pkt Info 302 indicates the length, in octets, of a field that is after the MAC Header Delimiter 322, before the security layer packet 352, and includes all the MAC Header related fields for all new mobile stations that are scheduled in the current MUP, such as Pkt Info 332, Length 338, and the optional MAC Index Extension 342.

In this implementation, the legacy mobile stations treats the Redirect MAC Index 306 as the MAC Index for one of the legacy mobile stations but not for itself. Therefore, this legacy mobile station treats the L1-octet-long field that is after the MAC Header Delimiter 322, before the security layer packet 352, and includes all the MAC Header related fields for all new mobile stations that are scheduled in the current MUP, as the payload of the security packet for this imaginary mobile station.

A new mobile station can recognize the special Redirect MAC Index in the first Pkt Info 302 and understand that after it detects the MAC Header Delimiter 322 field there is a L1-octet-long field that includes all the MAC Header related fields for at least one new mobile stations, such as Pkt Info 332, Length 338, and the optional MAC Index Extension 342. Therefore, the new mobile station will search for its own MAC Index in the Pkt Info fields, and if exists, the MAC Index Extension 342, after the MAC Header Delimiter 322. To support a large number of MAC indices, for example 1024 MAC indices, the New MAC Index 336 will be 10-bit long. The new Length 338 field may also be longer than 8 bits to indicate a larger security packet size in octets for the corresponding security packet in the MAC Payload. Therefore, when the total length of m Pkt Info fields and Length fields for m new mobile stations is not an integer number of octets, a MAC Header PAD 342 is added after the last length field of the new mobile stations and before the beginning of the security packets, to make the total length of m Pkt Info fields and Length fields, and the MAC Header PAD to be equal to the next round-up integer number. The MAC Header PAD shall be all zeros bits and have a length less than 8.

The true payload of (n−1) security packets 352, 358 for the legacy mobile stations, if any, is placed in the first section of the MAC Layer Payload. And m security packets 362, 368 are placed in the second section of the MAC Layer Payload. The legacy mobile stations will ignore the second section of the MAC Layer payload. The new mobile stations will compute the beginning of its own security packet by decoding the length fields for all legacy mobile stations that are scheduled in the current MUP, if any, plus the length fields for any new mobile stations whose MAC Index appears earlier in the current MUP.

A MAC Trailer 396 field, which is "00", is added at the end of the MAC layer packet. If the total length from the first Pkt Info 302 to the last security packet 368 is less than the MAC Packet size minus 2 bits, a PAD 392 field will be inserted between the last security packet 368 and the MAC Trailer 396. This PAD field shall be set to all "0" with a length of the MAC Packet size minus 2 bits minus the total length from the first Pkt Info 302 to the last security packet 368.

Each Pkt Info field 302, 312, 332 is one octet (8 bits) long. Each Length field 308, 338 is also one octet long. The first bit in the Pkt Info 332 for the new mobile station is a Format Bit 334. The remaining seven bits are named New MAC Index 336.

Figure 4A:
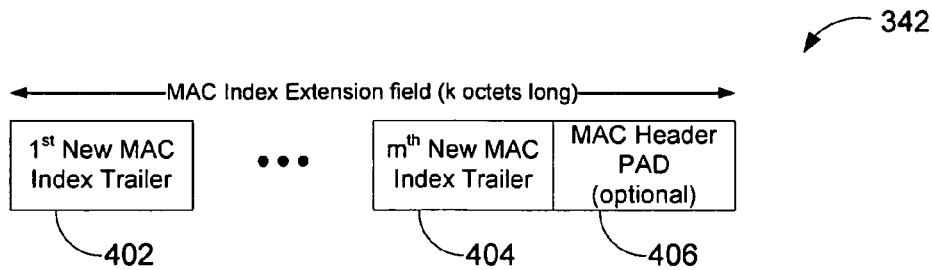
FIG. 4A shows an example of MAC Index Extension field that consists of New MAC Index Trailer field(s) and optional Padding field when the maximum MAC Index is greater than 255.

The MAC Index Extension 342 field is omitted if the system supports a maximum MAC Index that is less than 256. FIG. 4A shows one realization of the detailed structure of the MAC Index Extension 342 field when the system supports a maximum MAC Index that is greater than 255. Referring to FIG. 4A, the MAC Index Extension 342 consists of m New MAC Index Trailer 402, 404 fields for m new mobile stations that are scheduled in the current MUP, followed by an optional MAC Header PAD 406 field. The $1^{st}$ New MAC Index Trailer 402 is associated with the $(n+1)^{th}$ Pkt Info 332, which is associated with the $(n+1)^{th}$ Pkt (security layer packet) 362. And the $m^{th}$ New MAC Index Trailer 404 is associated with the $(n+m)^{th}$ Pkt Info, which is associated with the $(n+m)^{th}$ Pkt 368. If the total length of m New MAC Index Trailers is an integer number of octets, the MAC Header PAD will be omitted. Otherwise, a MAC Header PAD 406 will be added after the last New MAC Index Trailer 404 to make the total length of m New MAC Index Trailers and the MAC Header PAD 406 to be equal to the next round-up integer number of octets. The MAC Header PAD 406, if added, shall be all "0" bits and has a length less than 8 bits.

Figure 4B:
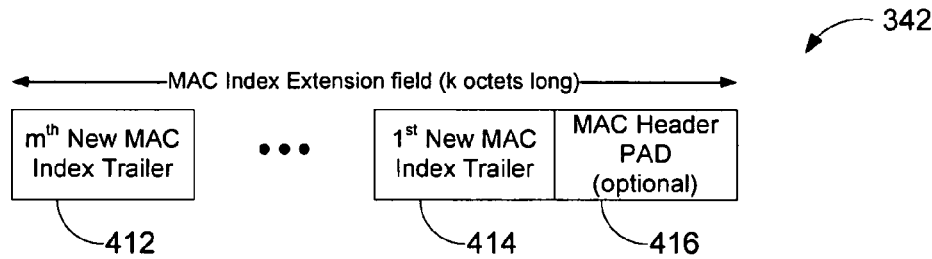
FIG. 4B shows another example of MAC Index Extension field that has New MAC Index Trailer field(s) and optional Padding field when the maximum MAC Index is greater than 255.
Figure 4C:
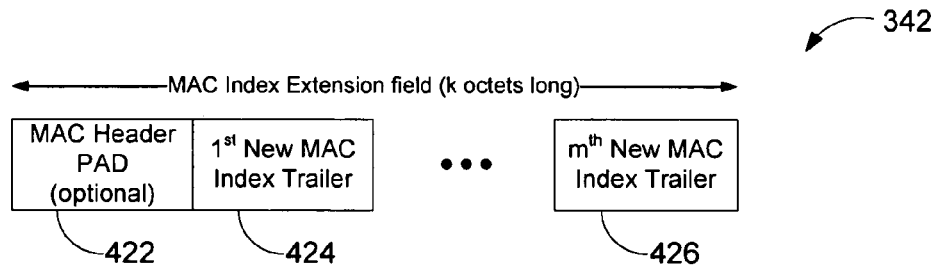
FIG. 4C shows yet another example of MAC Index Extension field that has New MAC Index Trailer field(s) and optional Padding field when the maximum MAC Index is greater than 255.
Figure 4D:
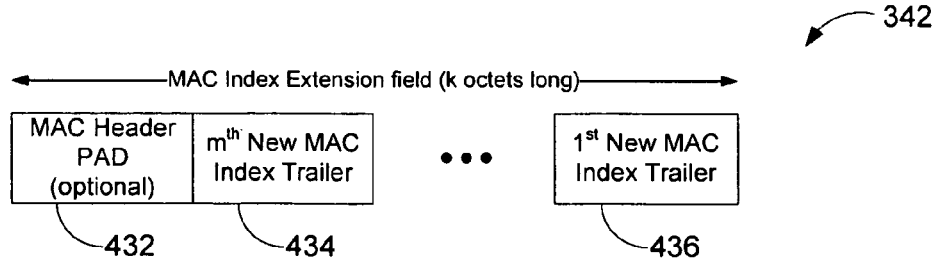
FIG. 4D shows yet another example of MAC Index Extension field that consists of New MAC Index Trailer field(s) and optional Padding field when the maximum MAC Index is greater than 255.

In the realization shown in FIG. 4A, the m New MAC Index trailers appear in the same order as their associated Pkt Info fields appear in the earlier portion of the MAC Header. In another realization, as shown in FIG. 4B, the m New MAC Index trailers 412, 414 appear in the reverse order as their associated Pkt Info fields appear in the earlier portion of the MAC Header. And the MAC Header PAD 416, if needed, is the last part of the MAC Index Extension field 342. In yet another realization, as shown in FIG. 4C, the m New MAC Index trailers 424, 426 appear in the same order as their associated Pkt Info fields appear in the earlier portion of the MAC Header, but they all follow the MAC Header PAD 422 field, if it exists. In yet another realization, as shown in FIG. 4D, the m New MAC Index trailers 434, 436 appear in the reverse order as their associated Pkt Info fields appear in the earlier portion of the MAC Header, and they all follow the MAC Header PAD 432 field, if it exists.

We will describe in later sections how the 7-bit New MAC Index 336 field and New MAC Index Trailer field in the optional MAC Index Extension 342 field can be used to support a variable-length MAC Index space. But let's first describe the Traffic Channel Assignment message that will convey the information of the length of the extended MAC Index space to the mobile stations.

As shown in Table 1 below, the Traffic Channel Assignment message contains at least a field of MessageID with a length of 8 bits to indicate the message type, a MessageSequence field with a length of 8 bits to indicate the message sequence number, a MACIndexCount field with a length of 2 bits to indicate the length of the extended MAC Index space, as shown in Table 2 below, and an assigned MAC Index that has a length equals to the length of the extended MAC Index space indicated by MACIndexCount, as shown in Table 2.

TABLE 1

| Field | Length (bits) |
|---|---|
| MessageID | 8 |
| MessageSequence | 8 |
| [...] | |
| MACIndexCount | 2 |
| MACIndex | MACIndexLength |

TABLE 2

| MACIndexCount | MACIndexLength (bits) |
|---|---|
| 00 | 8 |
| 01 | 9 |
| 10 | 10 |
| 11 | 11 |

The MACIndexCount field in Table 1 and Table 2 can be modified to be 3-bits if more choices for, up to 8, length of the extended MAC Index space are desirable in implementation.

After receiving the length information of the extended MAC Index space via the Traffic Channel Assignment message as described above, the new mobile stations, after decoding the physical layer packet of the MUP correctly, will search its own assigned MAC Index according to Table 3 and the descriptions below, according to one embodiment.

If the length of MAC Index space is 8 bits, there will be no New MAC Index Trailers as the entire MAC Index Extension 342 is omitted. The seven bits in the New MAC Index 336 will indicate the difference between an assigned MAC Index and 128. Therefore, if a new mobile station's assigned MAC Index equals to 128 plus the value in a New MAC Index field, a match is found. In this configuration, the system can support up a maximum MAC Index of 255.

TABLE 3

| MACIndex Length (bits) | Maximum MAC Index | New MAC Index | New MAC Index Trailer |
|---|---|---|---|
| 8 | 255 | MAC Index - 128 | None |
| 9 | 383 | $B_6B_5B_4B_3B_2B_1B_0$ of (MAC Index - 128) | $B_7$ of (MAC Index - 128) |
| 10 | 639 | $B_6B_5B_4B_3B_2B_1B_0$ of (MAC Index - 128) | $B_8B_7$ of (MAC Index - 128) |
| 11 | 1151 | $B_6B_5B_4B_3B_2B_1B_0$ of (MAC Index - 128) | $B_9B_8B_7$ of (MAC Index - 128) |

If the length of MAC Index space is 9 bits, the New MAC Index Trailers 402, 404, 412, 414, 424, 426, 434, 436 will be 1-bit long and will indicate the most significant bit (MSB) $B_7$ of the difference between an assigned MAC Index and 128. The seven bits in the New MAC Index 336 will indicate the seven LSBs $B_6B_5B_4B_3B_2B_1B_0$ of difference between an assigned MAC Index and 128. Therefore, if a new mobile station's assigned MAC Index equals to 128 plus the value of $B_7B_6B_5B_4B_3B_2B_1B_0$ found in a New MAC Index field and its associated New MAC Index Trailer field, a match is found. In this configuration, the system can support up a maximum MAC Index of 383.

If the length of MAC Index space is 10 bits, the New MAC Index Trailers 402, 404, 412, 414, 424, 426, 434, 436 will be 2-bit long and will indicate the two MSBs $B_8B_7$ of the difference between an assigned MAC Index and 128. The seven bits in the New MAC Index 336 will indicate the seven LSBs $B_6B_5B_4B_3B_2B_1B_0$ of difference between an assigned MAC Index and 128. Therefore, if a new mobile station's assigned MAC Index equals to 128 plus the value of $B_8B_7B_6B_5B_4B_3B_2B_1B_0$ found in a New MAC Index field and its associated New MAC Index Trailer field, a match is found. In this configuration, the system can support up a maximum MAC Index of 639.

If the length of MAC Index space is 11 bits, the New MAC Index Trailers 402, 404, 412, 414, 424, 426, 434, 436 will be 3-bit long and will indicate the three MSBs $B_9B_8B_7$ of the difference between an assigned MAC Index and 128. The seven bits in the New MAC Index 336 will indicate the seven LSBs $B_6B_5B_4B_3B_2B_1B_0$ of difference between an assigned MAC Index and 128. Therefore, if a new mobile station's assigned MAC Index equals to 128 plus the value of $B_9B_8B_7B_6B_5B_4B_3B_2B_1B_0$ found in a New MAC Index field and its associated New MAC Index Trailer field, a match is found. In this configuration, the system can support up a maximum MAC Index of 1151.

According to another embodiment, a new mobile station will search its own assigned MAC Index according to Table 4 and the descriptions below.

TABLE 4

| MACIndex Length (bits) | Maximum MAC Index | New MAC Index | New MAC Index Trailer |
|---|---|---|---|
| 8 | 255 | MAC Index - 128 | None |
| 9 | 511 | $B_6B_5B_4B_3B_2B_1B_0$ of MAC Index | $B_8B_7$ of MAC Index |
| 10 | 1023 | $B_6B_5B_4B_3B_2B_1B_0$ of MAC Index | $B_9B_8B_7$ of MAC Index |
| 11 | 2047 | $B_6B_5B_4B_3B_2B_1B_0$ of MAC Index | $B_{10}B_9B_8B_7$ of MAC Index |

If the length of MAC Index space is 8 bits, it is same as previously described 8-bit case in Table 3.

If the length of MAC Index space is 9 bits, the New MAC Index Trailers 402, 404, 412, 414, 424, 426, 434, 436 will be 2-bit long and will indicate the two most significant bits (MSB) $B_8B_7$ of an assigned MAC Index. The seven bits in the New MAC Index 336 will indicate the seven LSBs $B_6B_5B_4B_3B_2B_1B_0$ of an assigned MAC Index. Therefore, if a new mobile station's assigned MAC Index equals to the value of $B_8B_7B_6B_5B_4B_3B_2B_1B_0$ found in a New MAC Index field and its associated New MAC Index Trailer field, a match is found. In this configuration, the system can support up a maximum MAC Index of 511.

If the length of MAC Index space is 10 bits, the New MAC Index Trailers 402, 404, 412, 414, 424, 426, 434, 436 will be 3-bit long and will indicate the three most significant bits $B_9B_8B_7$ of an assigned MAC Index. The seven bits in the New MAC Index 336 will indicate the seven LSBs $B_6B_5B_4B_3B_2B_1B_0$ of an assigned MAC Index. Therefore, if a new mobile station's assigned MAC Index equals to the value of $B_9B_8B_7B_6B_5B_4B_3B_2B_1B_0$ found in a New MAC Index field and its associated New MAC Index Trailer field, a match is found. In this configuration, the system can support up a maximum MAC Index of 1023.

If the length of MAC Index space is 11 bits, the New MAC Index Trailers 402, 404, 412, 414, 424, 426, 434, 436 will be 4-bit long and will indicate the four most significant bits $B_{10}B_9B_8B_7$ of an assigned MAC Index. The seven bits in the New MAC Index 336 will indicate the seven LSBs $B_6B_5B_4B_3B_2B_1B_0$ of an assigned MAC Index. Therefore, if a new mobile station's assigned MAC Index equals to the value of $B_{10}B_9B_8B_7B_6B_5B_4B_3B_2B_1B_0$ found in a New MAC Index field and its associated New MAC Index Trailer field, a match is found. In this configuration, the system can support up a maximum MAC Index of 2047.

The disclosed and other embodiments and the functional operations described in this specification can be implemented in digital electronic circuitry, or in computer software, firmware, or hardware, including the structures disclosed in this specification and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data.

While this specification contains many specifics, these should not be construed as limitations on the scope of any invention or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understand as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments have been described. Other embodiments are within the scope of the following claims.

What is claimed is:

1. A method for wireless communications, comprising:

providing in a forward data packet, in a Media Access Control (MAC) Layer generated from a base station, a MAC header sequence and a MAC payload sequence subsequent to the MAC header sequence, wherein the MAC header sequence includes mobile station identification information to identify one or more mobile stations, and the MAC payload sequence includes data packets directed to the one or more mobile stations;

including in the MAC header sequence one or more first MAC index fields that are respectively assigned first MAC index values up to a maximum MAC index value to identify respective mobile stations;

including in the MAC header sequence one or more second MAC index fields that are respectively assigned second MAC index values greater than the maximum MAC index value; and including a redirect MAC index field in the MAC header sequence at a position in time prior to the first MAC index fields and the second MAC index fields to direct a target mobile station to read the one or more first MAC index fields when the target mobile station is assigned a MAC index value less than the maximum MAC index value and to read the one or more second MAC index fields when the target mobile is assigned a MAC index value greater than the maximum MAC index value, wherein the redirect MAC index value is not used to identify a particular mobile station.

2. The method as in claim 1, further comprising:

designating one of 128 MAC index values assigned to the base station under IS-856 Revision A as a value to the redirect MAC index field; and using one of remaining 127 MAC index values assigned to the base station for each first MAC index field.

3. The method as in claim 1, further comprising:

causing the target mobile station, which is assigned a MAC index value less than the maximum MAC index value in one of the one or more first MAC index fields, to treat a value in the redirect MAC index field as a first MAC index value for another mobile station and continue to read a subsequent first MAC index field; and causing the target mobile station, which is assigned a MAC index value greater than the maximum MAC index value in one of the one or more second MAC index fields, to skip the one or more first MAC index fields to read the one or more second MAC index fields.

4. The method as in claim 1, further comprising:

providing a second MAC index trailer in the MAC header sequence for each of the one or more second MAC index fields to store most significant bits of a MAC index number; and using the respective second MAC index field to store least significant bits of the respective MAC index number.

5. The method as in claim 1, further comprising:

providing a second MAC index trailer in the MAC header sequence for at least one of the one or more second MAC index fields to store most significant bits of a difference based on an assigned MAC index number.

6. A wireless communication system, comprising:

a plurality of base stations, each base station is operable to provide in a forward data packet, in a Media Access Control (MAC) Layer generated from a base station a MAC header sequence and a MAC payload sequence subsequent to the MAC header sequence, wherein the MAC header sequence includes mobile station identification information to identify one or more mobile stations, and the MAC payload sequence includes data packets directed to the one or more mobile stations;

include in the MAC header sequence one or more first MAC index fields that are respectively assigned first MAC index values up to a maximum MAC index value to identify respective mobile stations;

include in the MAC header sequence one or more second MAC index fields that are respectively assigned second MAC index values greater than the maximum MAC index value; and include a redirect MAC index field in the MAC header sequence at a position in time prior to the first MAC index fields and the second MAC index fields to direct a target mobile station to read the one or more first MAC index fields when the target mobile station is assigned a MAC index value less than the maximum MAC index value and to read the one or more second MAC index fields when the target mobile is assigned a MAC index value greater than the maximum MAC index value, wherein the redirect MAC index value is not used to identify a particular mobile station.

* * * * *

UNITED STATES PATENT AND TRADEMARK OFFICE
CERTIFICATE OF CORRECTION

PATENT NO.       : 7,706,342 B2
APPLICATION NO.  : 11/507206
DATED            : April 27, 2010
INVENTOR(S)      : Yunsong Yang It is certified that error appears in the above-identified patent and that said Letters Patent is hereby corrected as shown below:

In Column 12, Line 57, in Claim 6, please delete "station" and insert -- station, --, therefor.

Signed and Sealed this
Twenty-sixth Day of April, 2011

David J. Kappos
*Director of the United States Patent and Trademark Office*